United States Patent
Ohto et al.

(10) Patent No.: US 7,282,849 B2
(45) Date of Patent: Oct. 16, 2007

(54) ALKALINE EARTH ALUMINATE PHOSPHOR, PHOSPHOR PASTE COMPOSITION AND VACUUM ULTRAVIOLET EXCITATION LIGHT EMITTING ELEMENT

(75) Inventors: Akihiro Ohto, Kanagawa (JP); Kouhei Matsuda, Kanagawa (JP); Takayuki Hisamune, Kanagawa (JP)

(73) Assignee: Kasei Optonix, Ltd., Odawara-shi (JP)

( * ) Notice: Subject to any disclaimer, the term of this patent is extended or adjusted under 35 U.S.C. 154(b) by 606 days.

(21) Appl. No.: 10/485,260

(22) PCT Filed: Jul. 31, 2002

(86) PCT No.: PCT/JP02/07803

§ 371 (c)(1),
(2), (4) Date: Feb. 9, 2004

(87) PCT Pub. No.: WO03/016431

PCT Pub. Date: Feb. 27, 2003

(65) Prior Publication Data

US 2004/0212292 A1    Oct. 28, 2004

(30) Foreign Application Priority Data

Aug. 13, 2001   (JP)   .............................. 2001-245132

(51) Int. Cl.
*H01J 61/44*   (2006.01)
*C09K 11/55*   (2006.01)
*C09K 11/64*   (2006.01)

(52) U.S. Cl. .............................. 313/486; 252/301.4 R; 252/301.6 R

(58) Field of Classification Search .......... 252/301.4 R, 252/485, 486, 301.6 R; 313/485–486
See application file for complete search history.

(56) References Cited

U.S. PATENT DOCUMENTS

| 4,085,351 | A | * | 4/1978 | Takahashi et al. ........... 313/486 |
| 4,161,457 | A | * | 7/1979 | Takahashi et al. ..... 252/301.4 R |
| 4,827,187 | A |   | 5/1989 | Verlijsdonk |
| 5,611,959 | A | * | 3/1997 | Kijima et al. .......... 252/301.4 R |
| 6,187,225 | B1 | * | 2/2001 | Rao ..................... 252/301.4 R |
| 6,627,114 | B2 | * | 9/2003 | Suzuki ................ 252/301.4 R |
| 2001/0030314 | A1 |   | 10/2001 | Ueda et al. |

FOREIGN PATENT DOCUMENTS

| EP | 287167 | 10/1988 |
| GB | 1190520 | 11/1968 |

(Continued)

Primary Examiner—Karabi Guharay
(74) Attorney, Agent, or Firm—Oblon, Spivak, McClelland, Maier & Neustadt, P.C.

(57) ABSTRACT

A phosphor improved against luminance deterioration with time under vacuum ultraviolet irradiation, a phosphor paste composition, and a vacuum ultraviolet excitation light emitting element high in luminance retaining rate and improved in luminance, are presented. An alkaline earth aluminate phosphor which is a phosphor represented by the formula a $(M_{1-x}Eu_x)O\cdot6Al_2O_3$ (wherein M represents at least one alkaline earth metal element selected from the group consisting of Ba, Sr and Ca, and x and a satisfy $0<x<1$ and $0.9 \leq a \leq 1.8$, respectively) and which has a wide-band peak over an angle region of diffraction angle ($2\theta$) of from 28° to 31° in powder diffraction X-ray spectrum by CuKα1 characteristics X-ray, and a vacuum ultraviolet excitation light emitting element provided with a fluorescent layer made of the phosphor.

20 Claims, 1 Drawing Sheet

FOREIGN PATENT DOCUMENTS

| | | |
|---|---|---|
| JP | 52-143985 | 11/1977 |
| JP | 56-12599 | 2/1981 |
| JP | 4-198390 | 7/1992 |
| JP | 2000-303065 | 10/2000 |
| JP | 2000-336353 | 12/2000 |
| JP | 2004244476 A * | 9/2004 |

* cited by examiner

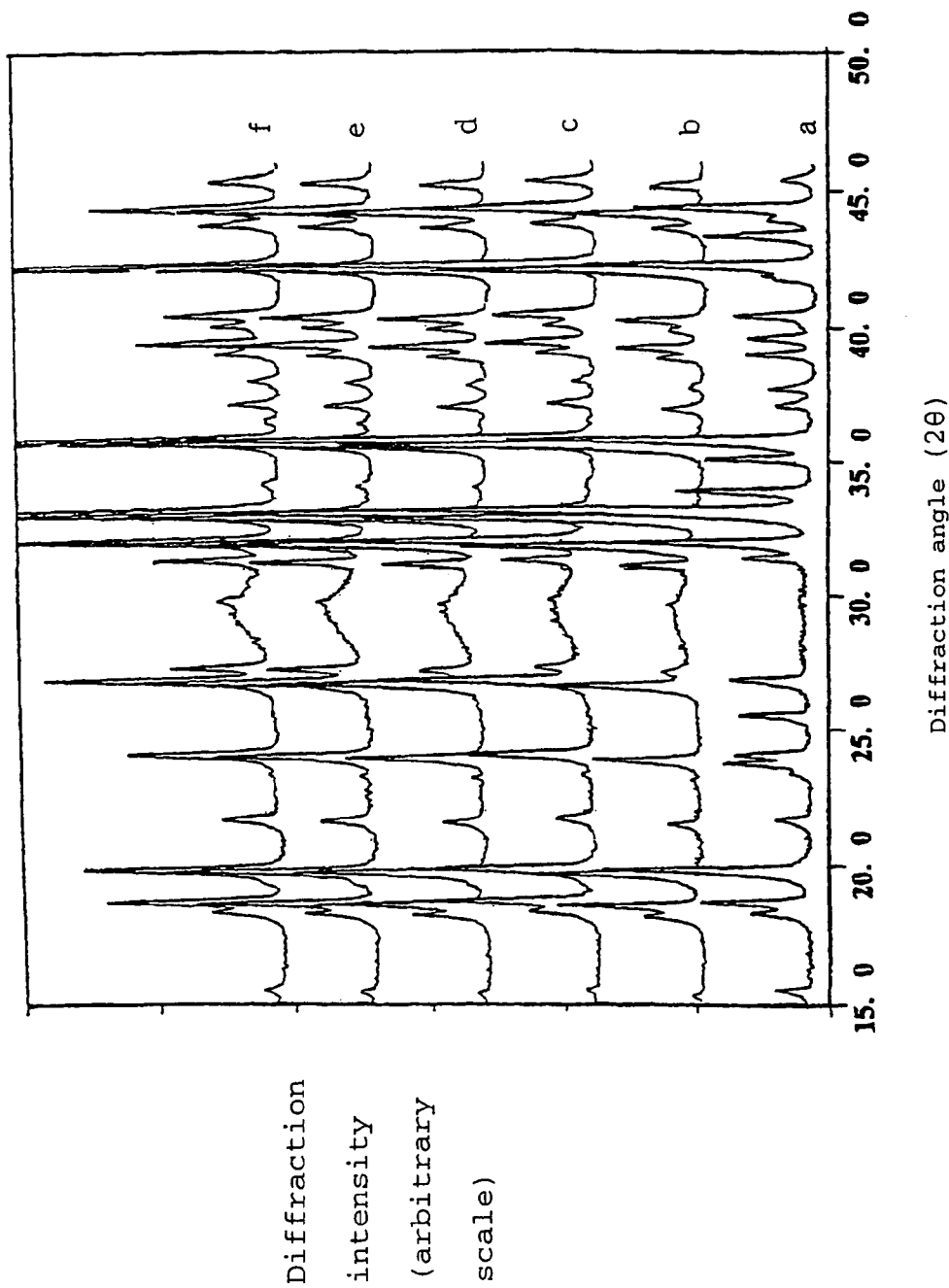

ALKALINE EARTH ALUMINATE PHOSPHOR, PHOSPHOR PASTE COMPOSITION AND VACUUM ULTRAVIOLET EXCITATION LIGHT EMITTING ELEMENT

TECHNICAL FIELD

The present invention relates to an alkaline earth aluminate phosphor which exhibits blue emission with high luminance showing little deterioration in luminance particularly under excitation by vacuum ultraviolet rays (VUV) having a wavelength of at most 200 nm, and a phosphor paste composition using such a phosphor, and a vacuum ultraviolet (VUV) excitation light emitting element which is capable of maintaining light emission highly efficiently with little deterioration in luminance.

BACKGROUND ART

As represented by, for example, a plasma display panel (PDP) or a rare gas lamp to be used as a light source for reading out by a scanner, a VUV excitation light emitting element has been actively developed and practically used in recent years, which has a structure or a function such that a fluorescent layer employing a phosphor which emits light under excitation by VUV, is formed in an envelope made of e.g. glass, and a rare gas such as Ar, Xe, He or Ne alone or as mixed, is sealed in the envelope, so that the fluorescent layer in the envelope is excited by VUV radiated by discharge of the sealed rare gas, to emit light.

Heretofore, as a phosphor to be used as a fluorescent layer of such a VUV excitation light emitting element, a red emitting phosphor such as (Y,Gd)BO$_3$:Eu, a green emitting phosphor such as LaPO$_4$:Ce,Tb, Zn$_2$SiO$_4$:Mn, BaAl$_{12}$O$_{19}$: Mn, (Ba,Sr,Mg)O.aAl$_2$O$_3$:Mn or YBO$_3$:Tb, or a blue emitting phosphor such as BaMgAl$_{10}$O$_{17}$:Eu or (Ba,Sr)MgAl$_{10}$O$_{17}$:Eu,Mn, has been used alone or as mixed.

As characteristics of the phosphor to be used as a fluorescent layer of a VUV excitation light emitting element, it is required that it emits light with higher luminance under excitation by VUV, that when a coating layer of the phosphor is subjected to baking treatment at a temperature of about 500° C. in a step of forming a fluorescent layer of a VUV excitation light emitting element, the emission luminance as the fluorescent layer will not decrease (luminance deterioration by baking is little), that even if the VUV excitation light emitting element is operated for a long period of time, and the phosphor is exposed to VUV continuously, the decrease in luminance of the phosphor (luminance deterioration by VUV) is little, and that the color purity of the emission color is good. However, phosphors which are presently practically used do not necessarily satisfy all of these characteristics. On the other hand, in the market, there is always a demand for more improvements of various properties of VUV excitation light emitting elements. Accordingly, also with respect to the phosphor for VUV excitation, it is desired to develop a new phosphor excellent in the above-mentioned characteristics.

Among phosphors for VUV excitation, an aluminate phosphor is a typical blue or bluish green emitting phosphor for VUV excitation, and a phosphor so-called BAM phosphor having bivalent Eu, or Eu and Mn, added as an activator to an aluminate of an alkaline earth metal containing Mg essentially as matrix crystal, such as BaMgAl$_{10}$O$_{17}$: Eu or (Ba,Sr)MgAl$_{10}$O$_{17}$:Eu,Mn, has been practically used as a blue or bluish green emitting phosphor for VUV excitation, excellent in the emission characteristics such as emission luminance. However, this BAM phosphor is a phosphor having drawbacks such that luminance deterioration by baking and luminance deterioration by VUV are substantial, and it is desired to develop a blue emitting or bluish green emitting phosphor for VUV excitation, whereby luminance deterioration by baking or luminance deterioration by VUV is little, which can be substituted for the BAM phosphor.

It is well known that an alkaline earth aluminate phosphor having Eu added as an activator to an alkaline earth metal salt containing no Mg in the matrix crystal, has the same aluminate as the BAM phosphor, exhibits blue emission when excited by ultraviolet rays having a wavelength longer than 200 nm (U.K. Patent 1,190,520, U.S. Pat. No. 4,827, 187). Various properties as a phosphor for VUV excitation have not heretofore been known with respect to this phosphor, including a question as to whether or not this phosphor will emit light with high luminance under excitation by VUV.

The present invention has been made with an intention to develop a blue emitting novel phosphor for VUV excitation and has an object to provide an alkaline earth aluminate phosphor which has high emission efficiency and which exhibits blue color emission with excellent color purity with little luminance deterioration by VUV as a phosphor for VUV excitation, a phosphor paste composition employing such a phosphor, and a VUV excitation light emitting element.

DISCLOSURE OF THE INVENTION

To accomplish the above object, the present inventors have studied in detail alkaline earth aluminate phosphors having various compositions containing Eu as an activator.

In general, even a phosphor which efficiently emits light when excited by ultraviolet rays having a wavelength longer than 200 nm, may not emit light with high efficiency when excited by VUV having a wavelength of at most 200 nm, and thus, the study is not easy.

However, the present inventors have made a study on an alkaline earth aluminate phosphor containing no Mg and containing Eu as an activator, which has heretofore been known as a phosphor for a mercury lamp and have found that it exhibits blue color emission under excitation by VUV having a wavelength of at most 200 nm and further that in a case where the crystal structure is of a certain specific structure, it exhibits light emission with high efficiency under excitation by VUV even if the chemical composition is the same, and further that the VUV resistance is improved, and the luminance deterioration by VUV is reduced. Further, it has been found that also with respect to a VUV excitation light emitting element provided with a fluorescent layer formed by using a phosphor paste composition having such a phosphor dispersed, the luminance deterioration by VUV of the blue color component can be reduced, and blue color emission with high luminance can be maintained even when it is used for a long period of time, and thus, the present invention has been accomplished.

Namely, the present invention provides the following constructions.

(1) An alkaline earth aluminate phosphor which is a phosphor represented by the formula a(M$_{1-x}$Eu$_x$)O.6Al$_2$O$_3$ and which is characterized by having a wide-band peak over an angle region of diffraction angle (2θ) of from 28° to 31° in powder diffraction X-ray spectrum by CuKα1 characteristics X-ray of said phosphor (provided that in the above formula, M represents at least one alkaline earth metal element selected from the group consisting of Ba, Sr and Ca, and x and a represent numbers satisfying the conditions of 0<x<1 and 0.9≦a≦1.8, respectively).

(2) The alkaline earth aluminate phosphor according to the above (1), characterized in that the above M comprises Ba in an amount of at least 50 mol % of the above alkaline earth metal element.

(3) The alkaline earth aluminate phosphor according to the above (1) or (2), characterized in that the half value width of the wide-band peak is at least 0.5°. (The alkaline earth aluminate phosphor according to the above (1) or (2), characterized by having a peak having a half value width of at least 0.5° over an angle region of diffraction angle (2θ) of from 28° to 31° of the spectrum, in the above-mentioned powder diffraction X-ray spectrum by CuKα1 characteristics X-ray of the phosphor.)

(4) The alkaline earth aluminate phosphor according to any one of the above (1) to (3), characterized in that the integral value of the peak present over an angle region of diffraction angle (2θ) of from 28° to 31° in powder diffraction X-ray spectrum (by CuKα1 characteristics X-ray of the phosphor) is at least 0.5 time the integral value of an independent peak present over an angle region of diffraction angle (2θ) of 21° to 22° of the spectrum.

(5) The alkaline earth aluminate phosphor according to any one of the above (1) to (4), characterized in that the phosphor is a phosphor for vacuum ultraviolet excitation, which emits light under excitation by vacuum ultraviolet rays having a wavelength of at most 200 nm.

(6) A phosphor paste composition which comprises a phosphor dispersed in a solvent having a binder dissolved therein and which is characterized in that the phosphor is an alkaline earth aluminate phosphor as defined in any one of the above (1) to (5).

(7) The phosphor paste composition according to the above (6), characterized in that the content of the phosphor is from 5 to 70 wt %.

(8) A vacuum ultraviolet excitation light emitting element which comprises a vacuum envelope having a fluorescent layer formed inside and a rare gas sealed in the vacuum envelope so that the fluorescent layer is excited by vacuum ultraviolet rays radiated by discharge of the rare gas, to emit light, and which is characterized in that a vacuum ultraviolet excitation alkaline earth aluminate phosphor as defined in any one of the above (1) to (5) is used for the fluorescent layer.

BRIEF DESCRIPTION OF THE DRAWINGS

The FIGURE is a powder diffraction x-ray spectrum of an alkaline earth aluminate phosphor containing the phosphor of the present invention.

BEST MODE FOR CARRYING OUT THE INVENTION

Now, the present invention will be described in detail.

The alkaline earth aluminate phosphor of the present invention is produced by the following series of operations. Firstly, with respect to the starting materials for the first step operation, compounds such as the respective oxides of (1) at least one alkaline earth element selected from the group consisting of Ba, Sr and Ca, (2) an Al element and (3) a Eu element as an activator, or carbonates, halides, etc. of the respective elements of these (1) to (3), are weighed in such proportions as to stoichiometrically bring the composition to a $(M_{1-x}Eu_x)O\cdot6Al_2O_3$ (wherein M is at least one alkaline earth metal element selected from the group consisting of Ba, Sr and Ca, and x and a represent numbers which satisfy the conditions of 0<x<1 and 0.9≦a≦1.8, respectively, the same applies hereinafter). Then, the phosphor starting material compounds made of such a mixture, are slowly mixed, packed in a heat resistant container such as an alumina crucible and baked. Thereafter, the obtained baked product is subjected to various treatments such as dispersing, washing with water, drying and sieving in the same manner as in the treating process commonly applied for the production of phosphors.

In the above compositional formula, in order to obtain a phosphor which emits light under VUV excitation, value x is required to be larger than 0 and smaller than 1, and with respect to value a, if it is smaller than 0.9 or larger than 1.8, the amount of impurity components included, tends to be stoichiometrically large, and a phosphor with high luminance and excellent in VUV resistance tends to be hardly obtainable, such being undesirable.

In the phosphor starting material compounds to be subjected to baking, in the same manner as in the case of producing a conventional alkaline earth aluminate phosphor such as a BAM phosphor, a chloride such as $AlF_3$, $BaF_2$, $CaF_2$, $SrF_2$ or $NH_4HF_2$ may be added as a flux to the mixture of phosphor starting material compounds to accelerate the reaction.

The alkaline earth aluminate phosphor of the present invention exhibits a blue color emission under excitation by VUV when in the compositional formula of $a(M_{1-x}Eu_x)O\cdot6Al_2O_3$, value x and value a are within the ranges of 0<x<1 and 0.9≦a≦1.8, respectively. However, from the viewpoint of the emission luminance under VUV excitation, it is particularly preferred that in the above compositional formula, the value x and the value a are 0.03≦x≦0.5 and 1.1≦a≦1.5, respectively. With respect to the values x and a in the above compositional formula, if the value x is smaller than 0.03 or larger than 0.5, the emission luminance under VUV excitation of the phosphor tends to be low. Further, with respect to the value a, if it is smaller than 1.1 or larger than 1.5, inclusion of impurity components is stoichiometrically unavoidable, and it tends to be difficult to obtain a phosphor excellent in VUV resistance with high luminance.

From the viewpoint of the emission luminance (resultant stimulus) under VUV excitation, the alkaline earth aluminate phosphor of the present invention is preferably such that element M constituting a part of the matrix crystal of the phosphor is Ba, or an alkaline earth metal element having at most 50 mol %, more preferably at most 20 mol %, of Ba substituted by at least one of Sr and Ca.

The starting material compounds for the phosphor are baked at least once over a period of from 2 to 40 hours depending upon the charged amount in a reducing atmosphere at a temperature of from 1300 to 1800° C. If the baking temperature is lower than 1300° C., the degree of luminance deterioration by VUV of the obtainable phosphor tends to be large, and no adequate emission luminance under VUV excitation tends to be obtained. On the other hand, if it is higher than 1800° C., an unnecessary energy will be consumed, such being industrially undesirable.

Further, to obtain the reducing atmosphere during the baking, a method of embedding graphite or activated carbon in the crucible packed with the starting material compounds for the phosphor, a method of embedding the crucible packed with the starting material compound for the phosphor, in a crucible packed with graphite or activated carbon, or a method of baking in a mixed gas of nitrogen and hydrogen, may, for example, be mentioned.

Further, steam may be contained in the baking atmosphere.

A characteristic of the alkaline earth aluminate phosphor of the present invention thus produced, is that a wide-band peak is observed over an angle region of diffraction angle (2θ) of from 28° to 31°, when the powder diffraction X-ray spectrum is measured by irradiating CuKα1 characteristics X-ray to the powder of this phosphor, and the spectrum is observed. The higher the intensity of this wide-band peak, the higher the emission luminance under VUV excitation of the phosphor, and yet the degree of luminance deterioration by VUV is less.

The wide-band peak observed over an angle region of the diffraction angle (2θ) of from 28° to 31° in the above-mentioned powder diffraction X-ray spectrum of the phosphor of the present invention, is not a small sharp peak locally observed, but is meant for a broad peak as is evident from the Figure. The half value width of this wide-band peak in an angle region of the diffraction angle (2θ) of from 28° to 31°, is at least 0.5°, further preferably at least 1°, whereby the emission luminance under VUV excitation can be further increased, and the luminance deterioration by VUV can be further suppressed, such being desirable.

Further, from another viewpoint, when the integral value ($I_{28}$) of the diffraction X-ray count number of the wide-band peak over an angle region of diffraction angle (2θ) of from 28° to 31° in the above powder diffraction X-ray spectrum and the integral value ($I_{21}$) of the diffraction X-ray count number of an independent peak appearing in an angle region of diffraction angle (2θ) of from 21° to 22° are respectively obtained, and their ratio (α) is calculated, if the value α is at least 0.5, the emission luminance under VUV excitation of the phosphor will be high, and the degree of luminance deterioration by VUV will be small. Further, from the viewpoint of improvement of the emission luminance and the effect for suppressing the luminance deterioration by VUV, it is more preferred that the value α is at least 0.8.

To obtain this value α, for example, in the case of the powder diffraction X-ray spectrum of a phosphor shown in the Figure, an angle region of diffraction angle (2θ) of from 16° to 17° is regarded as the background since no peak of X-ray diffraction intensity is observed in this angle region, and the integral value ($I_{16}$) of the diffraction X-ray count number in this angle region of from 16° to 17° is obtained, and further the integral value ($I_{28}$) of the diffraction X-ray count number of a wide peak in an angle region of diffraction angle (2θ) of from 28° to 31° and the integral value ($I_{21}$) of the diffraction x-ray count number of an independent peak appearing in an angle region of diffraction angle (2θ) of 21° to 22° are obtained, respectively, whereupon the value α can be obtained by calculating a value of $(I_{28}-3 \times I_{16})/(I_{21}-I_{16})$.

The Figure is a graph showing the powder diffraction X-ray spectrum by CuKα1 characteristics X-ray, of an alkaline earth aluminate phosphor of the following Example 1, having the above compositional formula wherein a=1.286 and x=0.1 {i.e. the compositional formula being 1.286 $(Ba_{0.9}, Eu_{0.1})O.6Al_2O_3$}. The figure, curves a, b, c, d, e and f are spectra measured with respect to the respective phosphors baked at 1200° C., 1300° C., 1400° C., 1500° C., 1600° C. and 1700° C., respectively, and the respective curves are drawn as piled so that the diffraction angles (abscissa) of the six curves i.e. curves a to f would agree to one another, whereby the relative heights along the ordinate can be relatively compared within each curve, but cannot be compared among the respective curves.

As is evident from the Figure, with the phosphors baked at from 1300° C. to 1700° C. (curves b to f), weak wide peaks are observed in angle regions of diffraction angle (2θ) of from 28° to 31° of the spectra in the powder diffraction X-ray spectra. Whereas, with the phosphor baked at 1200° C. (curve a), no such a peak is observed in the angle region of diffraction angle (2θ) of from 28° to 31° in the powder diffraction X-ray spectrum. This wide-band peak appearing in an angle region of diffraction angle (2θ) of from 28° to 31° in the powder diffraction X-ray spectrum was observed with the alkaline earth aluminate phosphor obtained by baking the phosphor materials at a temperature of at least 1300° C., but was not observed with the phosphor baked at a temperature lower than 1300° C.

Further, the alkaline earth aluminate phosphor of the present invention exhibits blue color emission with good color purity even when excited by ultraviolet rays or electron rays having a wavelength longer than 200 nm or by electromagnetic waves or ionizing radiation such as X-rays.

Now, the phosphor paste composition of the present invention will be described.

The phosphor paste composition of the present invention comprises components which are commonly used in conventional phosphor paste compositions, except that as a phosphor powder, the alkaline earth aluminate phosphor of the present invention obtained as described above, is used.

The phosphor paste composition of the present invention is produced in the same manner as in the case of producing a conventional phosphor paste composition except that the alkaline earth aluminate phosphor of the present invention is employed. For example, it can be obtained by thoroughly stirring and kneading a mixture obtained by mixing predetermined amounts of the alkaline earth aluminate phosphor of the present invention and a solvent having a binder resin dissolved therein, to disperse the phosphor and at the same time to adjust the viscosity to a level suitable for the particular purpose.

As the binder resin to be used together with the above alkaline earth aluminate phosphor in the production of the phosphor paste composition of the present invention, ethylcellulose, nitrocellulose, polyethylene oxide or an acrylic resin, may, for example, be used depending upon the particular purpose. Further, as the solvent to be used together with the phosphor and the binder resin in order to disperse the phosphor and the binder resin and to adjust the viscosity, water, butyl acetate, butylcarbitol, butylcarbitol acetate or terpineol may, for example, be mentioned.

The amount of the alkaline earth aluminate phosphor to be incorporated, is from 5 to 70 wt % based on the total weight of the phosphor and the binder resin excluding the solvent, and it is preferred to admix this phosphor and the solvent having the binder resin dissolved, to stir and knead the mixture and finally to add the solvent to adjust the viscosity, from the viewpoint of controlling the thickness of the coating film or efficiency of the coating operation.

Now, the VUV excitation light emitting element of the present invention will be described in detail.

In a case of producing a rare gas lamp as one of VUV excitation light emitting elements of the present invention, for example, from one end of a transparent slender glass tube having a desired inner diameter, the phosphor paste composition of the present invention having the viscosity adjusted to such an extent that it is capable of flowing on the inner wall surface of the tube, is cast, coated and dried and further subjected to baking treatment to burn off the organic component, or a glass plate or the like having the phosphor paste composition coated and dried thereon, is put into a slender glass tube, to prepare a fluorescent layer. Then, the inside of this glass tube is evacuated, and then, a small amount of rare gas is sealed in the tube, whereupon electrodes are attached to both ends of the slender glass tube, or to inner and outer both sides of the glass tube wall, or to the opposing both sides on the exterior of the glass tube, and both ends of the glass tube are sealed. In this manner, a rare gas lamp as one of VUV excitation light emitting elements of the present invention is prepared.

Further, in a case of producing PDP as another example of the VUV excitation light emitting element of the present invention, for example, inner electrodes are formed on a rear plate such as a glass plate, and partition walls in a strip or matrix pattern are formed to constitute a plurality of cells, whereupon red, green and blue phosphor paste compositions are coated by a method such as a screen printing method on the bottoms and inner walls of the respective partition walls constituting the cells for the respective colors of red, green and blue. As the blue color phosphor paste, the phosphor paste composition of the present invention is employed. The coated plate is dried and baked to form fluorescent layer in each cell, and a front plate made of e.g. a glass plate having internal electrodes formed with a constant space is disposed to face the rear plate, whereupon the peripheries of the front plate and the rear plate are sealed, and inside is evacuated, and then a rare gas is sealed in to obtain PDP as one of VUV excitation light emitting elements of the present invention.

Further, VUV excitation light emitting elements of the present invention other than the above-mentioned rare gas lamp or PDP, irrespective of the types or forms, are produced by coating the phosphor paste composition of the present invention on the surface of a support which will be a fluorescent surface in an envelope in the respective VUV excitation light emitting elements, by a known method, followed by drying and baking treatment to form each fluorescent layer, and sealing a rare gas in the envelope having the fluorescent layer formed therein.

In such a manner, the VUV excitation light emitting element of the present invention is obtainable as a VUV excitation light emitting element with high luminance and with little decrease in emission luminance during the operation.

EXAMPLES

Now, the present invention will be described in detail with reference to Examples of the present invention and Comparative Examples, but it should be understood that the present invention is by no means restricted by the following Examples.

Example 1A

| | |
|---|---|
| BaCO$_3$ | 1.1574 mols |
| Eu$_2$O$_3$ | 0.0643 mol |
| Al$_2$O$_3$ | 6.0 mols |
| AlF$_3$ | 0.01 mol |

The above respective phosphor materials were thoroughly mixed and then filled in an alumina crucible, and graphite was put, whereupon the cover was put, followed by baking in steam-containing nitrogen at a maximum temperature of 1600° C. over a period of 24 hours including the temperature raising time. Then, the baked powder was sieved to obtain an alkaline earth aluminate phosphor having a compositional formula of $1.286(Ba_{0.9}Eu_{0.1})O \cdot 6Al_2O_3$.

The powder diffraction X-ray spectrum by CuKα1 characteristics X-ray of this phosphor was measured, whereby a wide-band peak was observed over an angle region of diffraction angle (2θ) of from 28° to 31° as shown by curve the Figure. The half value width of the wide-band peak was 1.10°, and the value α was 1.15.

Example 1B 30 wt % of the alkaline earth aluminate phosphor of Example 1A, 10 wt % of butylcarbitol, 53 wt % of butylcarbitol acetate and 7 wt % of ethyl cellulose were thoroughly kneaded to obtain a phosphor paste composition of Example 1B.

This phosphor paste composition of Example 1B was coated in a thickness of 500 μm on a glass plate and left to dry at 120° C. for 30 minutes, followed by baking in the air at 500° C. for 30 minutes to obtain a fluorescent layer, which was irradiated with VUV having a wavelength of 146 nm, whereby the emission luminance and luminescent chromaticity (value x, value y) were measured by a luminance meter, and the emission luminance was divided by value y of the chromaticity coordinate of the emission color to obtain a resultant stimulus (luminance/y). When the resultant stimulus (luminance/y) of a fluorescent layer made of a phosphor paste composition of the following Comparative Example 1B, obtained under the same conditions as above, is rated to be 100, the resultant stimulus (luminance/y) of the fluorescent layer made of the phosphor paste composition of Example 1B was 271.4.

Further, the luminance of a blue emitting phosphor changes substantially in proportion to the emission color (value y of the chromaticity point), and it is common to compare a value obtained by dividing the luminance by value y, as a convenient method for mutually comparing the emission efficiency among phosphors different in the emission color (value y). Therefore, also in the present invention, the resultant stimuli (luminance/y) as defined above were obtained from the respective measured values of the emission luminance, and mutually compared.

Example 1C

The phosphor paste composition of Example 1B obtained as described above, was coated on a glass plate having a width of 2 mm, dried at 120° C. for 60 minutes and then baked at 500° C. for 30 minutes. This glass plate was held in a glass tube having an outer diameter of 4 mm, and nickel electrodes were attached to both ends of this glass tube, and the inside of the tube was evacuated to vacuum, whereupon a gas comprising 98% of Ne and 2% of Xe was sealed in to a level of 50 Torr to obtain a VUV excitation light emitting element (rare gas lamp) of Example 1C. This VUV excitation light emitting element of Example 1C was continuously lighted, whereby the resultant stimuli (luminance/y) immediately after being lighted and upon expiration of 24 hours from being lighted, were obtained, and the relative value (resultant stimulus-maintaining rate) of the resultant stimulus (luminance/y) upon expiration of 24 hours after being lighted, to one immediately after being lighted, was calculated, whereby the resultant stimulus-maintaining rate of the VUV excitation light emitting element of Example 1C was 85%.

In Table 1, types of phosphor materials used to produce the phosphor of Example 1A and their blend ratio and the baking temperature, are shown.

Further, in Table 2, the compositional formula of the phosphor of Example 1A, the presence or absence of a wide-band X-ray diffraction peak appearing in the angle region of diffraction angle (2θ) of from 28° to 31° in the powder diffraction X-ray spectrum, the half value width, the value α, the relative resultant stimulus (luminance/y) under VUV excitation of the fluorescent layer made of the phosphor paste composition of Example 1B, and the resultant stimulus-maintaining rate of the VUV excitation light emitting element of Example 1C, are shown, respectively.

Examples 2A to 16A, and Comparative Example 1A

Using phosphor materials comprising the compounds and their blend ratio as identified in Table 1, phosphors of Examples 2A to 16A and Comparative Example 1A were obtained in the same manner as in Example 1A except that these materials were baked at baking temperatures as identified in Table 1.

In Table 2, the compositions of these phosphors of Examples 2A to 16A and Comparative Example 1A, and presence or absence of a wide-band X-ray diffraction peak appearing in an angle region of diffraction angle (2θ) of from 28° to 31° in the powder diffraction X-ray spectrum, the half value width and the value α, are shown.

Examples 2B to 16B, and Comparative Example 1B

Phosphor paste compositions of Examples 2B to 16B and Comparative Example 1B were prepared in the same manner as in the case of producing the phosphor paste composition of Example 1B except that the respective phosphors of Examples 2A to 16A and Comparative Example 1A were used instead of the phosphor of Example 1A.

Fluorescent layers made of these compositions were prepared in the same manner as in Example 1B, and they were irradiated with VUV having a wavelength of 146 nm, and light emission was measured under the same conditions as in Example 1B, and the respective resultant stimulus (luminance/y) was obtained, and the relative value of the resultant stimulus (luminance/y) of each fluorescent layer, when the resultant stimulus (luminance/y) of the fluorescent layer made of the phosphor of Comparative Example 1B was rated to be 100, and the results are shown in Table 2.

Examples 2C to 16C, and Comparative Example 1C

VUV excitation light emitting elements of Examples 2C to 16C and Comparative Example 1C were prepared in the same manner as in the case of producing the VUV excitation light emitting element of Example 1C except that fluorescent layers were prepared by using the respective phosphor paste compositions of Examples 2B to 16B and Comparative Example 1B instead of the phosphor paste composition of Example 1B. The resultant stimuli-maintaining rates of the VUV excitation light emitting elements were measured in the same manner as in Example 1C, and the results are shown in table 2.

Comparative Example 2A

| | |
|---|---|
| $BaCO_3$ | 0.9 mol |
| $Eu_2O_3$ | 0.05 mol |
| $3MgCO_3 \cdot Mg(OH)_2$ | 0.25 mol |
| $Al_2O_3$ | 5.0 mols |
| $AlF_3$ | 0.01 mol |

The above respective phosphor materials were thoroughly mixed and then filled into an alumina crucible, and graphite was put. A cover was put, followed by baking in steam-containing nitrogen at a maximum temperature of 1450° C. over a period of 24 hours including the temperature raising time and then by cooling to obtain a primary baked product. The obtained baked powder was sieved to obtain a BAM phosphor of Comparative Example 2A having a compositional formula of $(Ba_{0.9}Eu_{0.1})MgAl_{10}O_{17}$.

In the powder diffraction of X-ray spectrum, no wide-band X-ray diffraction peak was observed in an angle region of diffraction angle (2θ) of from 28° to 31°.

Comparative Example 2B

A phosphor paste composition of Comparative Example 2B was prepared in the same manner as in the case of producing the phosphor paste composition of Example 1B except that the BAM phosphor of Comparative Example 2A was used instead of the phosphor of Example 1A.

In the same manner as in Example 1B, a fluorescent layer made of this composition was prepared, and it was irradiated with VUV having a wavelength of 146 nm, whereby the resultant stimulus (luminance/y) of the light emission was obtained, whereby when the resultant stimulus (luminance/y) of the fluorescent layer made of the phosphor paste composition of the above Comparative Example 1B was rated to be 100, the resultant stimulus (luminance/y) of the fluorescent layer made of the phosphor paste composition of Comparative Example 2B, was 188.4.

Comparative Example 2C

A VUV excitation light emitting element of Comparative Example 2V was prepared in the same manner as in the case of producing the VUV excitation light emitting element of Example 1C except that the BAM phosphor of Comparative Example 2A was used instead of the phosphor paste composition of Example 1B.

The resultant stimulus-maintaining rate of this VUV excitation light emitting element was measured in the same manner as in Example 1C, whereby the resultant stimulus-maintaining rate was 82.1%.

TABLE 1

| Ex. No. (Comp. Ex. No.) | Phosphor material compounds and their blend ratio (mols) | | | | | | Baking temperature (°C.) |
|---|---|---|---|---|---|---|---|
| | $BaCO_3$ | $CaCO_3$ | $SrCO_3$ | $Al_2O_3$ | $Eu_2O_3$ | $AlF_3$ | |
| Ex. 1 (A, B, C) | 1.1574 | 0 | 0 | 6.0 | 0.0643 | 0.01 | 1600 |
| Ex. 2 (A, B, C) | 1.0931 | 0.0643 | 0 | 6.0 | 0.0643 | 0.01 | 1600 |
| Ex. 3 (A, B, C) | 1.0931 | 0 | 0.0643 | 6.0 | 0.0643 | 0.01 | 1600 |
| Ex. 4 (A, B, C) | 1.2217 | 0 | 0 | 6.0 | 0.03215 | 0.01 | 1600 |
| Ex. 5 (A, B, C) | 1.0288 | 0 | 0 | 6.0 | 0.1286 | 0.01 | 1600 |
| Ex. 6 (A, B, C) | 1.1574 | 0 | 0 | 6.0 | 0.0643 | 0.01 | 1300 |
| Ex. 7 (A, B, C) | 1.1574 | 0 | 0 | 6.0 | 0.0643 | 0.01 | 1400 |
| Ex. 8 (A, B, C) | 1.1574 | 0 | 0 | 6.0 | 0.0643 | 0.01 | 1500 |
| Ex. 9 (A, B, C) | 1.1574 | 0 | 0 | 6.0 | 0.0643 | 0.01 | 1700 |
| Ex. 10 (A, B, C) | 0.81 | 0 | 0 | 6.0 | 0.045 | 0.01 | 1600 |
| Ex. 11 (A, B, C) | 0.9 | 0 | 0 | 6.0 | 0.05 | 0.01 | 1600 |
| Ex. 12 (A, B, C) | 0.99 | 0 | 0 | 6.0 | 0.055 | 0.01 | 1600 |
| Ex. 13 (A, B, C) | 1.08 | 0 | 0 | 6.0 | 0.06 | 0.01 | 1600 |
| Ex. 14 (A, B, C) | 1.35 | 0 | 0 | 6.0 | 0.075 | 0.01 | 1600 |
| Ex. 15 (A, B, C) | 1.5048 | 0 | 0 | 6.0 | 0.0836 | 0.01 | 1600 |
| Ex. 16 (A, B, C) | 1.62 | 0 | 0 | 6.0 | 0.09 | 0.01 | 1600 |
| Comp. Ex. 1 (A, B, C) | 1.1574 | 0 | 0 | 6.0 | 0.0643 | 0.01 | 1200 |

TABLE 2

| Ex. No. (Comp. Ex. No.) | Composition of phosphor | Presence or absence of a diffraction peak at from 28 to 31° | Half value width (degrees) | Value α | Resultant stimulus of fluorescent layer (luminous/value y) [relative value] | Resultant stimulus-maintaining rate of VUV excitation light emitting light element (%) |
|---|---|---|---|---|---|---|
| Ex. 1 (A, B, C) | $1.286(Ba_{0.9}Eu_{0.1})O \cdot 6Al_2O_3$ | Present | 1.10 | 1.15 | 271.4 | 88.8 |
| Ex. 2 (A, B, C) | $1.286(Ba_{0.85}Ca_{0.05}Eu_{0.1})O \cdot 6Al_2O_3$ | Present | 1.11 | 1.11 | 273.1 | 85.4 |
| Ex. 3 (A, B, C) | $1.286(Ba_{0.85}Sr_{0.05}Eu_{0.1})O \cdot 6Al_2O_3$ | Present | 1.09 | 1.03 | 271.4 | 84.2 |
| Ex. 4 (A, B, C) | $1.286(Ba_{0.95}Eu_{0.05})O \cdot 6Al_2O_3$ | Present | 1.13 | 1.02 | 264.8 | 93.3 |
| Ex. 5 (A, B, C) | $1.286(Ba_{0.8}Eu_{0.2})O \cdot 6Al_2O_3$ | Present | 1.21 | 1.16 | 209.3 | 83.6 |
| Ex. 6 (A, B, C) | $1.286(Ba_{0.9}Eu_{0.1})O \cdot 6Al_2O_3$ | Present | 0.57 | 0.70 | 206.5 | 83.0 |
| Ex. 7 (A, B, C) | $1.286(Ba_{0.9}Eu_{0.1})O \cdot 6Al_2O_3$ | Present | 1.54 | 1.00 | 213.1 | 84.3 |
| Ex. 8 (A, B, C) | $1.286(Ba_{0.9}Eu_{0.1})O \cdot 6Al_2O_3$ | Present | 1.16 | 0.87 | 237.2 | 86.1 |
| Ex. 9 (A, B, C) | $1.286(Ba_{0.9}Eu_{0.1})O \cdot 6Al_2O_3$ | Present | 1.08 | 1.08 | 272.9 | 87.6 |
| Ex. 10 (A, B, C) | $0.9(Ba_{0.9}Eu_{0.1})O \cdot 6Al_2O_3$ | Present | 0.50 | 0.90 | 216.1 | 82.3 |
| Ex. 11 (A, B, C) | $1.0(Ba_{0.9}Eu_{0.1})O \cdot 6Al_2O_3$ | Present | 0.66 | 1.78 | 217.1 | 89.0 |
| Ex. 12 (A, B, C) | $1.1(Ba_{0.9}Eu_{0.1})O \cdot 6Al_2O_3$ | Present | 1.18 | 1.72 | 241.3 | 91.1 |
| Ex. 13 (A, B, C) | $1.2(Ba_{0.9}Eu_{0.1})O \cdot 6Al_2O_3$ | Present | 1.10 | 2.07 | 260.2 | 95.4 |
| Ex. 14 (A, B, C) | $1.5(Ba_{0.9}Eu_{0.1})O \cdot 6Al_2O_3$ | Present | 1.18 | 3.07 | 271.6 | 97.4 |
| Ex. 15 (A, B, C) | $1.67(Ba_{0.9}Eu_{0.1})O \cdot 6Al_2O_3$ | Present | 1.52 | 3.55 | 272.7 | 97.8 |
| Ex. 16 (A, B, C) | $1.8(Ba_{0.9}Eu_{0.1})O \cdot 6Al_2O_3$ | Present | 1.67 | 3.92 | 264.4 | 97.5 |
| Comp. Ex. 1 (A, B, C) | $1.286(Ba_{0.9}Eu_{0.1})O \cdot 6Al_2O_3$ | Absent | 0.15 | 0.17 | 100.0 | 82.2 |
| Comp. Ex. 2 (A, B, C) | $(Ba_{0.9}Eu_{0.1})MgAl_{10}O_{17}$ | Absent | — | — | 188.4 | 82.1 |

As is evident from Table 2, with the VUV excitation light emitting elements (Examples 1C to 16C) having fluorescent layers made of alkaline earth aluminate phosphors of the present invention having crystal structures which have a wide-band peak over an angle region of diffraction angle (2θ) of from 28° to 31° in the powder diffraction X-ray spectra by CuKα1 characteristics X-ray, the degree of luminance deterioration by VUV of the phosphors is reduced as compared with the VUV excitation light emitting element (Comparative Example 1C) having a fluorescent layer made of a conventional alkaline earth aluminate phosphor having a crystal structure which has no wide-band peak in an angle region of diffraction angle (2θ) of from 28° to 31°, whereby the resultant stimulus-maintaining rate is remarkably improved.

Further, the emission efficiency represented by the resultant stimulus (luminance/y) under VUV excitation, was also as high as from 2 to 2.7 times in the case of the fluorescent layers made of the phosphor pastes (Examples 1B to 16B) of the present invention, as compared with the fluorescent layer made of the phosphor paste (Comparative Example 1B) containing the conventional alkaline earth aluminate phosphor having a crystal structure which has no wide-band peak in an angle region of diffraction angle (2θ) of from 28° to 31°.

Further, the resultant stimulus-maintaining rate in the case of a VUV excitation light emitting element of the present invention (Examples 1C to 16C) was substantially improved as compared with the VUV excitation light emitting element (Comparative Example 2C) having a fluorescent layer made of the BAM phosphor.

INDUSTRIAL APPLICABILITY

The Eu-activated alkaline earth aluminate phosphor of the present invention and the phosphor paste composition employing it, exhibit blue color emission with high efficiency under excitation with VUV having a wavelength of at most 200 nm with little luminance deterioration by VUV. Accordingly, a VUV excitation light emitting element prepared by using the phosphor paste composition of the present invention is capable of maintaining light emission with high luminance with little change in the emission efficiency during a long hour operation.

The invention claimed is:

1. An alkaline earth aluminate phosphor which is a phosphor represented by the formula $a(M_{1-x}Eu_x)O \cdot 6Al_2O_3$ and which is characterized by having a wide-band peak over an angle region of diffraction angle ($2\theta$) of from 28° to 31° in powder diffraction X-ray spectrum by CuKα1 characteristics X-ray of said phosphor, wherein in the above formula, M represents at least one alkaline earth metal element selected from the group consisting of Ba, Sr and Ca, and x and a represent numbers satisfying the conditions of $0<x<1$ and $0.9 \leq a \leq 1.8$ respectively.

2. The alkaline earth aluminate phosphor according to claim 1, wherein the half value width of the wide-band peak is at least 0.50°.

3. A vacuum ultraviolet excitation light emitting element which comprises a vacuum envelope having a fluorescent layer formed inside and a rare gas sealed in the vacuum envelope so that the fluorescent layer is excited by vacuum ultraviolet rays radiated by discharge of the rare gas, to emit light, and wherein a vacuum ultraviolet excitation alkaline earth aluminate phosphor as defined in claim 2 is used for the fluorescent layer.

4. The alkaline earth aluminate phosphor according to claim 2, wherein the integral value of the peak present over an angle region of diffraction angle ($2\theta$) of from 28° to 31° in powder diffraction X-ray spectrum is at least 0.5 time the integral value of an independent peak present over an angle region of diffraction angle ($2\theta$) of 21° to 22° of the spectrum.

5. A phosphor paste composition which comprises a phosphor dispersed in a solvent having a binder dissolved therein and wherein the phosphor is an alkaline earth aluminate phosphor as defined in claim 4.

6. A vacuum ultraviolet excitation light emitting element which comprises a vacuum envelope having a fluorescent layer formed inside and a rare gas sealed in the vacuum envelope so that the fluorescent layer is excited by vacuum ultraviolet rays radiated by discharge of the rare gas, to emit light, and wherein a vacuum ultraviolet excitation alkaline earth aluminate phosphor as defined in claim 4 is used for the fluorescent layer.

7. A phosphor paste composition which comprises a phosphor dispersed in a solvent having a binder dissolved therein and wherein the phosphor is an alkaline earth aluminate phosphor as defined in claim 2.

8. The alkaline earth aluminate phosphor according to claim 1, wherein the integral value of the peak present over an angle region of diffraction angle ($2\theta$) of from 28° to 31° in powder diffraction X-ray spectrum is at least 0.5 time the integral value of an independent peak present over an angle region of diffraction angle ($2\theta$) of 21° to 22° of the spectrum.

9. A phosphor paste composition which comprises a phosphor dispersed in a solvent having a binder dissolved therein and wherein the phosphor is an alkaline earth aluminate phosphor as defined in claim 8.

10. A vacuum ultraviolet excitation light emitting element which comprises a vacuum envelope having a fluorescent layer formed inside and a rare gas sealed in the vacuum envelope so that the fluorescent layer is excited by vacuum ultraviolet rays radiated by discharge of the rare gas, to emit light, and wherein a vacuum ultraviolet excitation alkaline earth aluminate phosphor as defined in claim 8 is used for the fluorescent layer.

11. A method of vacuum ultraviolet excitation comprising causing the alkaline earth aluminate phosphor according to claim 1 to emit light under excitation by vacuum ultraviolet rays having a wavelength of at most 200 nm.

12. A phosphor paste composition which comprises a phosphor dispersed in a solvent having a binder dissolved therein and wherein the phosphor is an alkaline earth aluminate phosphor as defined in claim 1.

13. The phosphor paste composition according to claim 12, wherein the content of the phosphor is from 5 to 70 wt %.

14. A vacuum ultraviolet excitation light emitting element which comprises a vacuum envelope having a fluorescent layer formed inside and a rare gas sealed in the vacuum envelope so that the fluorescent layer is excited by vacuum ultraviolet rays radiated by discharge of the rare gas, to emit light, and wherein a vacuum ultraviolet excitation alkaline earth aluminate phosphor as defined in claim 1 is used for the fluorescent layer.

15. The alkaline earth aluminate phosphor according to claim 1, wherein $0.03 \leq x \leq 0.5$ and $1.1 \leq a \leq 1.5$.

16. The alkaline earth aluminate phosphor according to claim 1, wherein M is Ba.

17. The alkaline earth aluminate phosphor according to claim 16, wherein Ba is substituted in an amount of at most 50 mol % by at least one of Sr and Ca.

18. The alkaline earth aluminate phosphor according to claim 17, wherein said amount is at most 20 mol %.

19. The alkaline earth aluminate phosphor according to claim 1, wherein the half value width of the wide-band peak is at least 1.0°.

20. A method of preparing the alkaline earth aluminate phosphor according to claim 1, which comprises baking starting material compounds of said phosphor at least once in a reducing atmosphere at a temperature of from 1300 to 1800° C.

* * * * *